United States Patent
Oji et al.

(10) Patent No.: US 12,493,842 B2
(45) Date of Patent: Dec. 9, 2025

(54) BUSINESS PROCESS CLASSIFICATION APPARATUS, BUSINESS PROCESS CLASSIFICATION METHOD AND PROGRAM

(71) Applicant: NTT, Inc., Tokyo (JP)

(72) Inventors: Saori Oji, Tokyo (JP); Shinobu Saito, Tokyo (JP)

(73) Assignee: NTT, Inc., Tokyo (JP)

( * ) Notice: Subject to any disclaimer, the term of this patent is extended or adjusted under 35 U.S.C. 154(b) by 211 days.

(21) Appl. No.: 18/553,004

(22) PCT Filed: Apr. 7, 2021

(86) PCT No.: PCT/JP2021/014809
§ 371 (c)(1),
(2) Date: Sep. 28, 2023

(87) PCT Pub. No.: WO2022/215205
PCT Pub. Date: Oct. 13, 2022

(65) Prior Publication Data
US 2024/0185157 A1    Jun. 6, 2024

(51) Int. Cl.
*G06Q 10/0631*    (2023.01)
(52) U.S. Cl.
CPC ............... *G06Q 10/06316* (2013.01)
(58) Field of Classification Search
None
See application file for complete search history.

(56) References Cited

U.S. PATENT DOCUMENTS

| | | | | |
|---|---|---|---|---|
| 11,620,605 B2 * | 4/2023 | Sridhara | ............... | G06Q 10/067 705/348 |
| 2007/0226222 A1 * | 9/2007 | Yamamoto | ............. | G06Q 10/06 707/999.009 |
| 2009/0234758 A1 * | 9/2009 | Chang | .................... | G06Q 40/12 705/30 |
| 2009/0313073 A1 * | 12/2009 | Bloom | ............... | G06Q 10/0637 705/7.36 |

(Continued)

FOREIGN PATENT DOCUMENTS

| | | | | |
|---|---|---|---|---|
| JP | 2017-187953 | 10/2017 | | |
| WO | WO-0131522 A2 * | 5/2001 | ............. | G06Q 30/06 |
| WO | WO-2018207506 A1 * | 11/2018 | ............. | G06Q 10/00 |

OTHER PUBLICATIONS

Jiajie Xu et al "Incorporating structural improvement into resource allocation for business process execution planning", Jun. 2012, Concurrency and Computation Practice and Experience, pp. 427-442 (Year: 2012).*

(Continued)

*Primary Examiner* — Romain Jeanty
(74) *Attorney, Agent, or Firm* — IPUSA, PLLC

(57) ABSTRACT

A business process classification device supports improvement in efficiency of analysis of a business process, since the business process classification device includes: a feature amount acquisition unit that acquires from each of a plurality of types of business processes a plurality of feature amounts related to a structure of each of the plurality of types of business processes; and a clustering execution unit that performs clustering based on the plurality of feature amounts for the plurality of types of business processes.

7 Claims, 11 Drawing Sheets

(56) References Cited

U.S. PATENT DOCUMENTS

2014/0358820 A1* 12/2014 Chatterjee ............ G06Q 10/067
705/348
2016/0371586 A1* 12/2016 Linehan ................. G06N 20/00

OTHER PUBLICATIONS

Julia Komarova "Definition of System for Business Process Modeling", 112019, Faculty of Engineering and Natural Sciences Master of Science Thesis, pp. 1-108. (Year: 2019).*
Linda et al CLAG: an unsupervised non-hierarchical clustering algorithm handling biological data, Dec. 2012, Biomed Central, pp. 1-14 (Year: 2012).*
Saori Ouji and Shinobu Saito, "Proposal of similar analysis method for business using task mining", IEICE Technical Report, vol. 120, No. 231, 2020, pp. 47-52.
Shinobu Saito, "Process City—Visualizing Business Processes as City Metaphor", Information Systems Engineering in Responsible Information Systems, CAiSE Forum 2019 Proceedings, Jun. 3, 2019, pp. 207-214.
Michele Berlingerio et al.,"NetSimile: A Scalable Approach to Size-Independent Network Similarity", arXiv, Sep. 12, 2012.
Dan Pelleg and Andrew Moore, "X-means: Extending K-means with efficient estimation of the number of clusters", ResearchGate, Jan. 2002.

* cited by examiner

Fig. 1
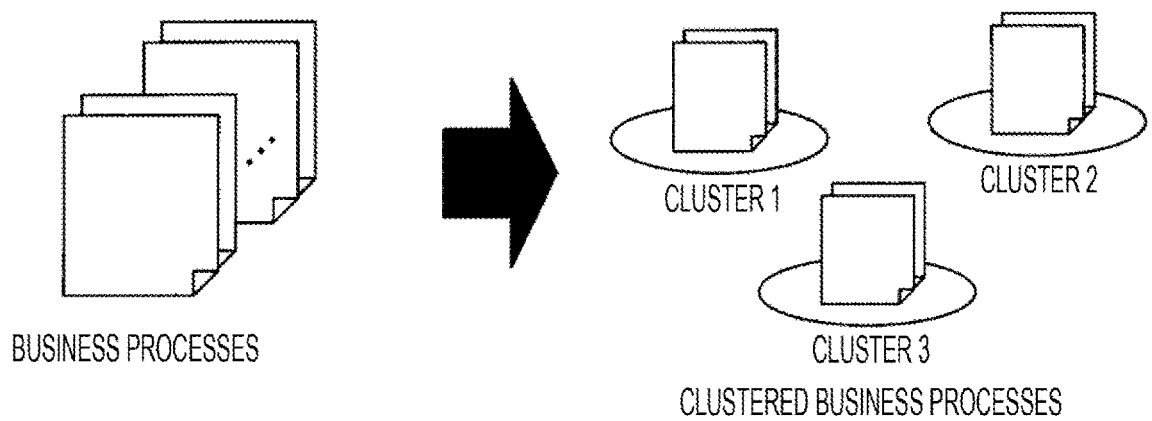
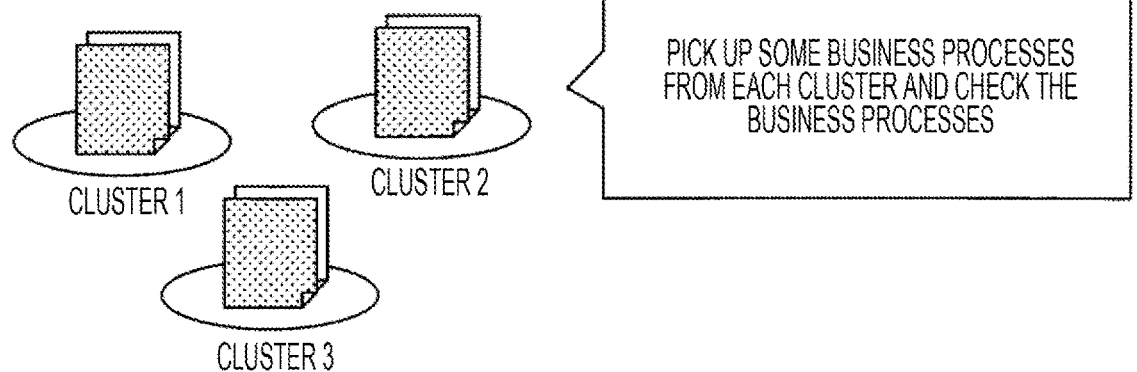

Fig. 5

| Case ID | TIME STAMP | ACTIVITY NAME | WORKER ID |
|---|---|---|---|
| C2 | T1 | A | U2 |
| C1 | T2 | A | U1 |
| C2 | T3 | C | U2 |
| C1 | T4 | B | U1 |
| C2 | T5 | B | U2 |
| C1 | T6 | C | U1 |
| C1 | T7 | B | U1 |
| C2 | T8 | D | U4 |
| C1 | T9 | D | U4 |
| C3 | T10 | A | U3 |
| C3 | T11 | A | U3 |

Fig. 6

| WORKER ID | ORGANIZATION NAME |
|---|---|
| U1 | O1 |
| U2 | O1 |
| U3 | O2 |
| U4 | O3 |

Fig. 7

| Case ID | TIME STAMP | ACTIVITY NAME | WORKER ID | ORGANIZATION NAME |
|---|---|---|---|---|
| C2 | T1 | A | U2 | O1 |
| C1 | T2 | A | U1 | O1 |
| C2 | T3 | C | U2 | O1 |
| C1 | T4 | B | U1 | O1 |
| C2 | T5 | B | U2 | O1 |
| C1 | T6 | C | U1 | O1 |
| C1 | T7 | B | U1 | O1 |
| C2 | T8 | D | U4 | O3 |
| C1 | T9 | D | U4 | O3 |
| C3 | T10 | A | U3 | O2 |
| C3 | T11 | A | U3 | O2 |

Fig. 8

| ACTIVITY NAME | ORGANIZATION NAME | EXECUTION FREQUENCY OF ACTIVITY | NUMBER OF USERS WHO HAVE PERFORMED ACTIVITY |
|---|---|---|---|
| A_1 | O1 | 6 | 2 |
| A_2 | O2 | 3 | 1 |
| B | O3 | 12 | 3 |
| C | O3 | 9 | 3 |
| D | O3 | 12 | 1 |

Fig. 9
| PATTERN NUMBER | EXECUTION ORDER | ACTIVITY NAME |
|---|---|---|
| 1 | 1 | A_1 |
| 1 | 2 | B |
| 1 | 3 | C |
| 1 | 4 | B |
| 1 | 5 | D |
| 2 | 1 | A_1 |
| 2 | 2 | C |
| 2 | 3 | B |
| 2 | 4 | D |
| 3 | 1 | A_2 |
| 3 | 2 | A_2 |
PATTERN NUMBER 1
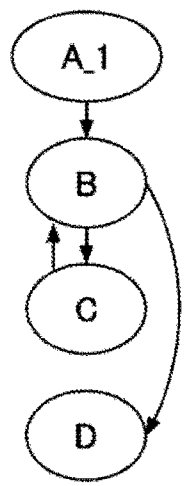
PATTERN NUMBER 2
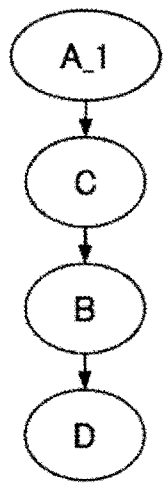

Fig. 10

| PATTERN No. | 1 | 2 |
|---|---|---|
| START ACTIVITY | A1 | A1 |
| END ACTIVITY | A3 | A3 |
| NUMBER OF SELF-LOOP OCCURRENCES | 0 | 1 |
| NUMBER OF REWORK OCCURRENCES | 0 | 1 |
| PATH LENGTH | 2 | 4 |
| NUMBER OF ASSOCIATED ORGANIZATIONS | 2 | 2 |
| IN-DEGREE (AVERAGE VALUE) | 0.5 | 1 |
| IN-DEGREE (MEDIAN VALUE) | 0.5 | 0.5 |
| IN-DEGREE (STANDARD DEVIATION) | 0.5 | 0 |
| OUT-DEGREE (AVERAGE VALUE) | 0.5 | 1 |
| OUT-DEGREE (MEDIAN VALUE) | 0.5 | 0.5 |
| OUT-DEGREE (STANDARD DEVIATION) | 0.5 | 0 |
| NUMBER OF EGO NET BRANCHES (AVERAGE VALUE) | 1 | 2 |
| NUMBER OF EGO NET BRANCHES (MEDIAN VALUE) | 1 | 1 |
| NUMBER OF EGO NET BRANCHES (STANDARD DEVIATION) | 0 | 0.471405 |
| NUMBER OF EGO NETWORK CONNECTION BRANCHES (INFLOW) (AVERAGE VALUE) | 0 | 0.333333 |
| NUMBER OF EGO NETWORK CONNECTION BRANCHES (INFLOW) (MEDIAN VALUE) | 0 | 0 |
| NUMBER OF EGO NETWORK CONNECTION BRANCHES (INFLOW) (STANDARD DEVIATION) | 0 | 0 |
| NUMBER OF EGO NETWORK CONNECTION BRANCHES (OUTFLOW) (AVERAGE VALUE) | 0 | 0.666667 |
| NUMBER OF EGO NETWORK CONNECTION BRANCHES (OUTFLOW) (MEDIAN VALUE) | 0 | 0 |
| NUMBER OF EGO NETWORK CONNECTION BRANCHES (OUTFLOW) (STANDARD DEVIATION) | 0 | 0 |

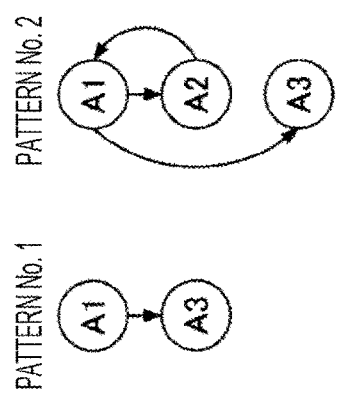

BUSINESS PROCESS CLASSIFICATION APPARATUS, BUSINESS PROCESS CLASSIFICATION METHOD AND PROGRAM

TECHNICAL FIELD

The present invention relates to a business process classification device, a business process classification method, and a program.

BACKGROUND ART

Process mining has been proposed as a technology for reducing operation of business analysis. Process mining is a technology of generating a use procedure of an information system when performing business as a business process on the basis of log data acquired from an information system.

The log data acquired from the information system includes name and time information (time stamp) of an activity performed on the system and an ID (hereinafter, referred to as "case ID") indicating a case for which the performed activity is intended, and therefore, it is possible to find a bottleneck activity and unnecessary activity by generating a business process for each case.

Although it has become possible to quantitatively measure and analyze business processes by utilizing process mining, analysts manually perform checking the generated business processes, finding problem points, and devising improvement measures. Therefore, in a case where the number of business processes generated by the process mining is enormous, it takes much operation to check the business processes.

In order to solve this problem, software that implements process mining narrows down the business process to be checked, which is necessary for devising an improvement measure, on the basis of information such as an execution time and a performed worker of the business process, thereby reducing the operation related to the business process check work.

A conventional technology has been proposed in which structural comparison between two business processes generated by process mining is repeated to derive a business process having a low similarity with other business processes, and presence or absence of variation in implementation of activity between actors who have performed the business process can be analyzed (Non Patent Literature 1).

CITATION LIST

Non Patent Literature

Non Patent Literature 1: Saori Ouji, Shinobu Saito, "Proposal of similar analysis method for business using task mining", The technical group of Knowledge Based Software Engineering (KBSE), vol. 120, no. 231, KBSE2020-24, pp. 47-52, November 2020.

SUMMARY OF INVENTION

Technical Problem

However, in the narrowing down using information regarding the business such as the execution time and the performed worker, the analyst himself/herself who performs the narrowing down needs to have knowledge of the business to be analyzed, and in some cases, preliminary investigation and understanding of the business are required.

In the method of Non Patent Literature 1, there is a problem that a calculation amount increases because structure comparison of all patterns is repeated with two generated business processes as a pair.

The present invention has been made in view of the above points, and an object thereof is to support improvement in efficiency of analysis of a business process.

Solution to Problem

Therefore, in order to solve the above problem, a business process classification device includes: a feature amount acquisition unit that acquires from each of a plurality of types of business processes a plurality of feature amounts related to a structure of each of the plurality of types of business processes; and a clustering execution unit that performs clustering based on the plurality of feature amounts for the plurality of types of business processes.

Advantageous Effects of Invention

It is possible to support improvement in efficiency of analysis of a business process.

BRIEF DESCRIPTION OF DRAWINGS

FIG. 1 is a diagram for describing an overview of an embodiment of the present invention.

FIG. 5 is a diagram illustrating an example of an event log.

FIG. 6 is a diagram illustrating an example of affiliation organization information.

FIG. 7 is a diagram illustrating an example of an event log to which an organization name is added.

FIG. 8 is a diagram illustrating an example of an AUM.

FIG. 9 is a diagram illustrating an example of a PAL.

FIG. 10 is a diagram illustrating an example of a feature amount acquisition result.

DESCRIPTION OF EMBODIMENTS

Hereinafter, an embodiment of the present invention will be described with reference to the drawings. The present embodiment discloses the business process classification device 10 that automatically classifies a business process group for each feature of a business process.

Overview of Present Embodiment

FIG. 1 is a diagram for describing an overview of the embodiment of the present invention. According to the present embodiment, a plurality of types of business processes performed in the past are classified into a plurality of clusters. An analyst can check a representative business process for each feature by extracting and checking several business processes from these clusters.

In the present embodiment, clustering is performed using a feature amount representing a structural feature of a business process in order to implement automatic classification of the business process.

In the present embodiment, a feature amount is extracted from each business process and the feature amounts are classified into several clusters to help an analyst to understand the business process while suppressing a calculation amount.

Details of Present Embodiment

Figure 2:
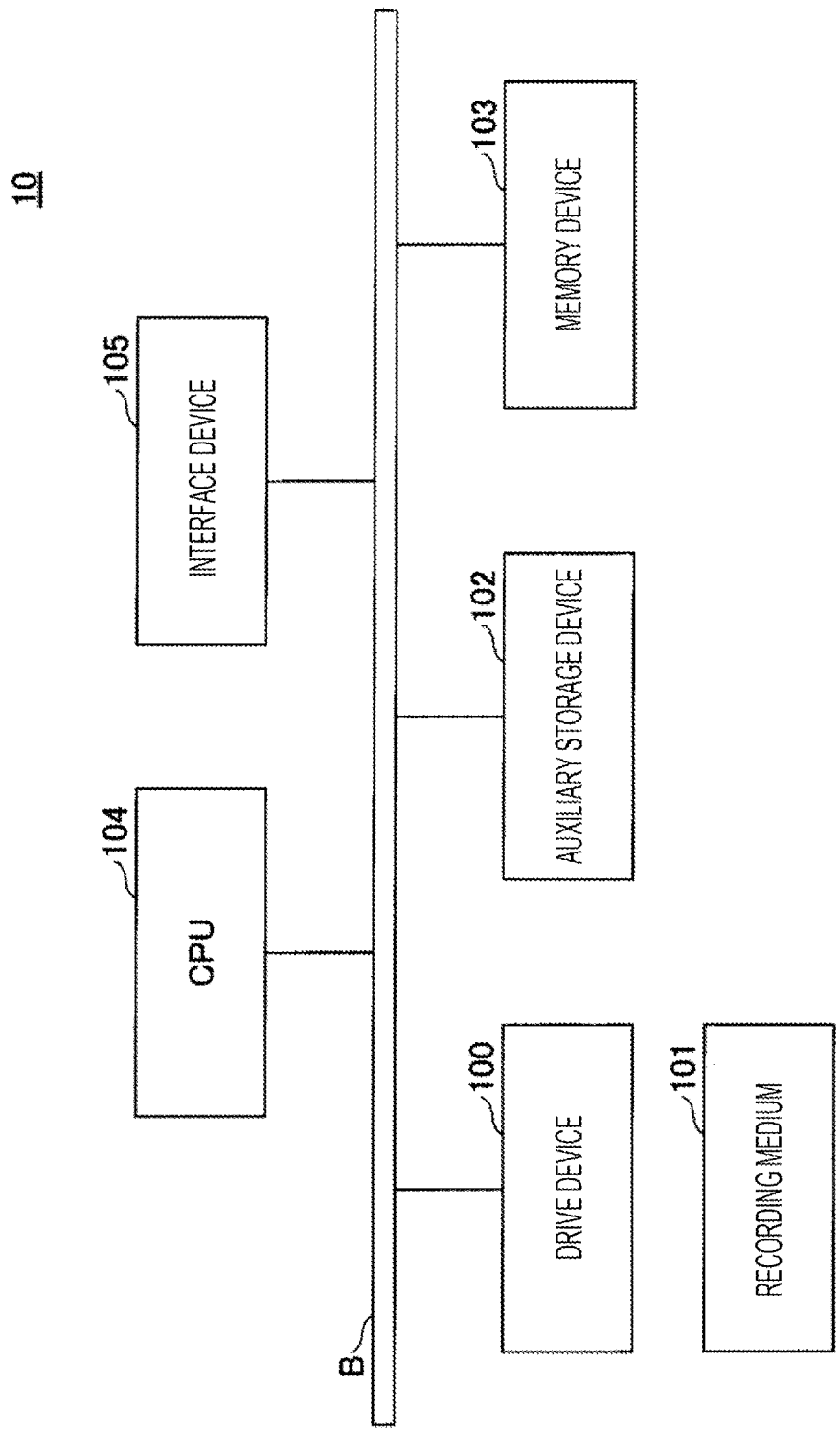
FIG. 2 is a diagram illustrating a hardware configuration example of a business process classification device 10 according to the embodiment of the present invention.

FIG. 2 is a diagram illustrating a hardware configuration example of the business process classification device 10 according to the embodiment of the present invention. The business process classification device 10 in FIG. 2 includes a drive device 100, an auxiliary storage device 102, a memory device 103, a CPU 104, an interface device 105, and the like which are connected to each other by a bus B.

A program for realizing processing in the business process classification device 10 is provided by a recording medium 101 such as a CD-ROM. When the recording medium 101 storing the program is set in the drive device 100, the program is installed from the recording medium 101 to the auxiliary storage device 102 via the drive device 100. However, the program is not necessarily installed from the recording medium 101 and may be downloaded from another computer via a network. The auxiliary storage device 102 stores the installed program and also stores necessary files, data, and the like.

In a case where an instruction to start the program is made, the memory device 103 reads the program from the auxiliary storage device 102 and stores the program. The CPU 104 executes a function related to the business process classification device 10 according to the program stored in the memory device 103. The interface device 105 is used as an interface for connecting to a network.

Figure 3:
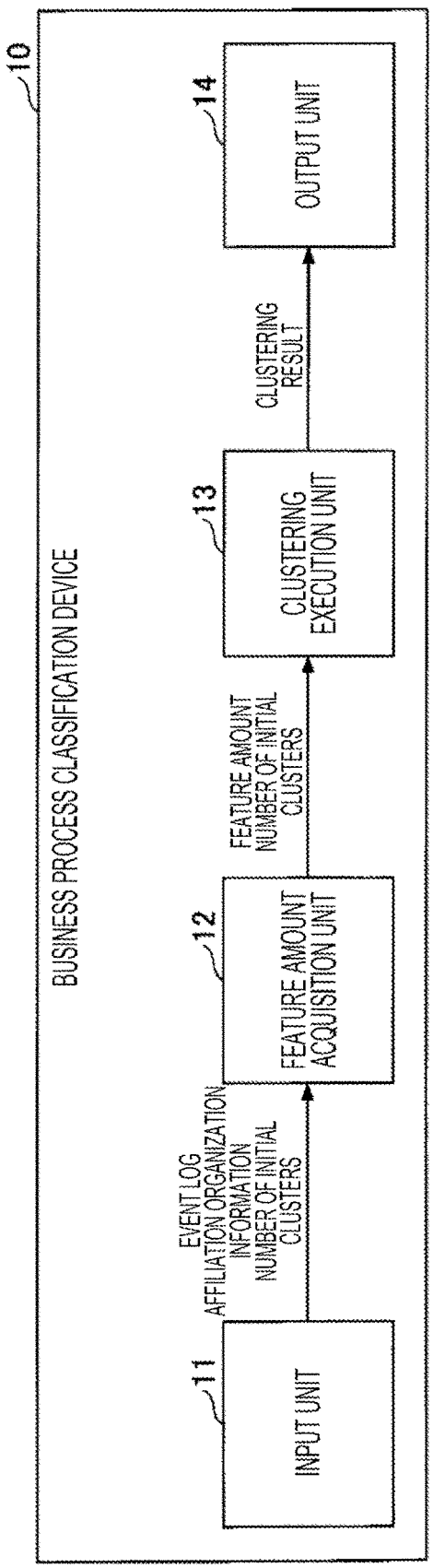
FIG. 3 is a diagram illustrating a functional configuration example of the business process classification device 10 according to the embodiment of the present invention.

FIG. 3 is a diagram illustrating a functional configuration example of the business process classification device 10 according to the embodiment of the present invention. In FIG. 3, the business process classification device 10 includes an input unit 11, a feature amount acquisition unit 12, a clustering execution unit 13, and an output unit 14. Each of these units is implemented by processing that is caused to be executed by the CPU 104 using one or more programs installed on the business process classification device 10.

Figure 4:
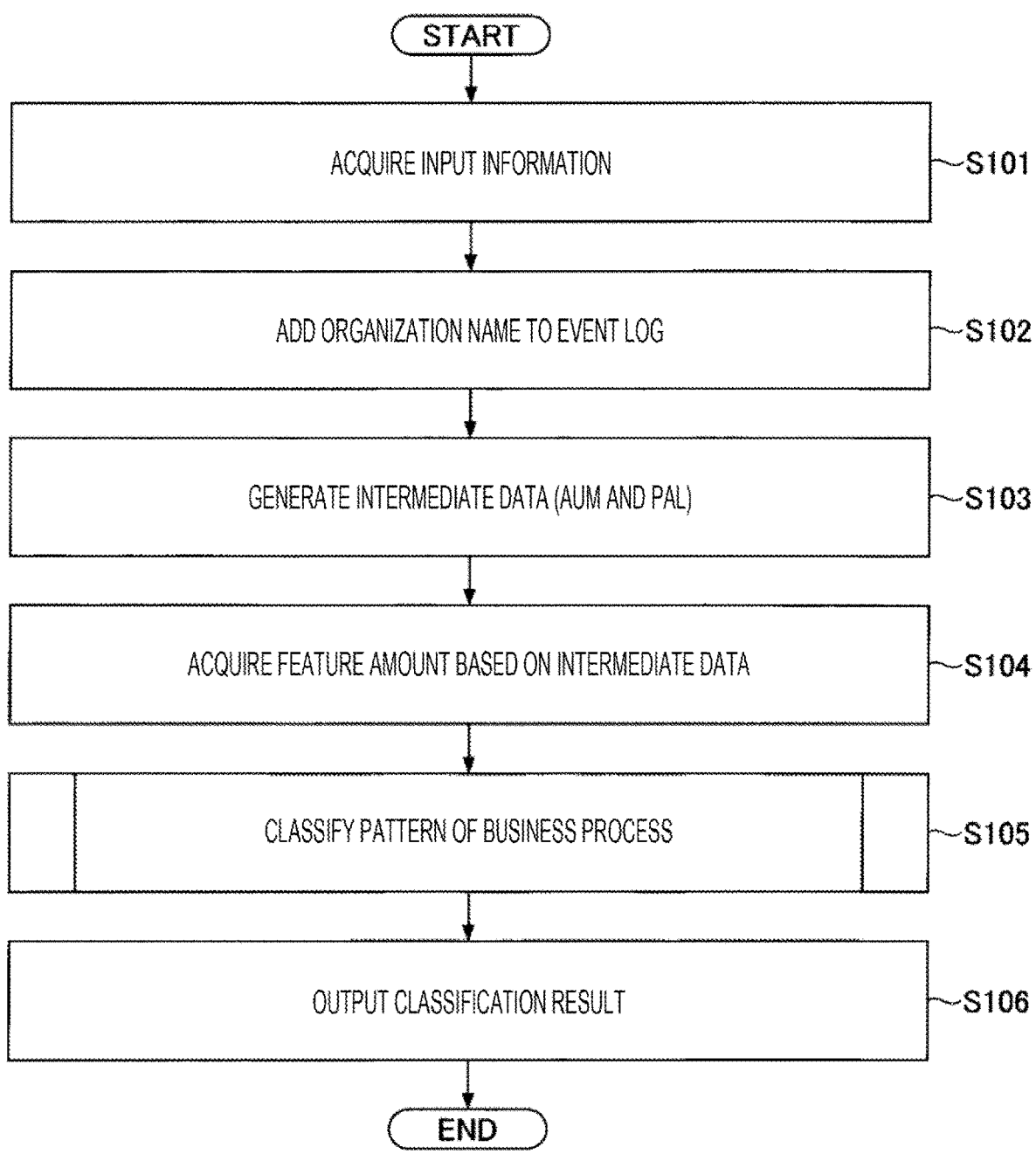
FIG. 4 is a flowchart for illustrating an example of a processing procedure performed by the business process classification device 10.

FIG. 4 is a flowchart for illustrating an example of a processing procedure performed by the business process classification device 10.

In step S101, the input unit 11 acquires an event log and affiliation organization information as input information.

The event log is data that is a generation source of a business process generated by process mining. That is, in process mining, a business process is usually generated using data called an event log.

FIG. 5 is a diagram illustrating an example of the event log. In the present embodiment, data of one row in FIG. 5 is referred to as an event log. One event log includes a "case ID", a time stamp, an activity name, and a worker ID for one activity (work process) performed in the business. That is, the event log is recorded each time an activity is performed.

The "case ID" is identification information of a business case that is an execution purpose of the activity. One or more activities are performed for one case. Here, the case corresponds to the business process. That is, a time series of activities having a common "case ID" corresponds to the business process. The timestamp is a date and time when the activity is performed. The worker ID is identification information of the performer (hereinafter, referred to as "worker") of the activity.

FIG. 6 is a diagram illustrating an example of affiliation organization information. As illustrated in FIG. 6, the affiliation organization information is information including an organization name of an organization to which the worker related to the worker ID belongs for each worker ID. The affiliation organization information is used when the number of organizations involved in the implementation of the business process is analyzed and the scale and complexity of the business are analyzed (JP 6522542 B2 and JP 6577914 B2).

In step S101, the input unit 11 may acquire an initial number of clusters arbitrarily set by the analyst as a part of the input information. The initial number of clusters is the minimum number of clusters used when the clustering execution unit 13 performs clustering of the business processes. In a case where the initial number of clusters is not set, the input unit 11 may set 2 as the initial number of clusters, for example. In this case, the business processes are classified into at least two or more clusters.

The input unit 11 inputs the acquired input information to the feature amount acquisition unit 12.

Subsequently, the feature amount acquisition unit 12 adds an organization name to each event log (FIG. 5) on the basis of the affiliation organization information (FIG. 6) (S102). Specifically, the feature amount acquisition unit 12 specifies an organization name associated with the worker ID of the event log in the affiliation organization information (FIG. 6) for each event log, and adds the specified organization name to the event log. As a result, the event log illustrated in FIG. 5 is, for example, as illustrated in FIG. 7. The following event log refers to the event log in the state of FIG. 7.

Subsequently, the feature amount acquisition unit 12 generates Activity-User Matrix (AUM) and Patten and ordered-Activity List (PAL) as intermediate data on the basis of the event log (FIG. 7) (S103).

FIG. 8 is a diagram illustrating an example of an AUM. The AUM is data described in Reference Literature 1 "Shinobu Saito, "Process City—Visualizing Business Process as City Metaphor", International Conference on Advanced Information Systems Engineering, CAiSE 2019: Information Systems Engineering in Responsible Information Systems pp 207-214". As illustrated in FIG. 8, the AUM indicates, for each activity, an organization name of an organization that has performed the activity, an execution frequency of the activity in the organization, and the number of users who has performed the activity in the organization.

FIG. 9 is a diagram illustrating an example of a PAL. As illustrated in FIG. 9, the PAL has items such as a "pattern number", an "execution order", and an "activity name", and each line of the PAL includes values of these items for each activity constituting the pattern of the business process. The business process pattern (hereinafter, simply referred to as a "pattern") refers to a type of business process (case). The type of the business process refers to a pattern (type) of an execution order of activities in the business process. In other words, the pattern is obtained by aggregating one or more business processes (cases) having a common execution order of the activities into one business process (case).

The "pattern number" is pattern identification information. A row group having a common pattern number corresponds to one pattern. The "execution order" is a numerical value indicating the execution order of the activity in the pattern.

The AUM and PAL can be generated using a process mining tool BPretriever described in Non Patent Literature 1 or JP 2017-187953 A. By expressing the organization information to which the worker who performed the activity belongs on the business process as a swim lane, the BPretriever makes it possible to analyze the activity performed for each organization and the execution frequency of the activity. In addition, in a case where the same activity is performed by a plurality of organizations, in order to distinguish them on the business process, the activity name is changed in the BPretriever and treated as another activity. As a result, in the case of AUM (FIG. 8) and PAL (FIG. 9) based on the event log (FIG. 7) in the present embodiment, since the activity "A" is performed by two organizations of O1 and O2, the activity "A" performed in O1 is distinguished as "A_1", and the activity "A" performed in O2 is distinguished as "A_2", and they are expressed as such on the pattern of the business process.

Subsequently, the feature amount acquisition unit 12 acquires a plurality of feature amounts for each pattern on the basis of the intermediate data (AUM and PAL), and inputs the acquired feature amounts and the initial number of clusters to the clustering execution unit 13 (S104). In the present embodiment, the following feature amounts (1) to (11) are acquired for each pattern. In the description of each feature amount, a pattern that is a feature amount acquisition target is referred to as a "target pattern". Only some of the following 11 feature amounts may be acquired. Alternatively, another feature amount may be acquired.

(1) Start Activity Name

A start activity name is an activity name of an activity performed first in the target pattern. The feature amount acquisition unit 12 acquires the activity name of the first row of the row group constituting the target pattern in the PAL as the start activity name.

(2) End Activity Name

An end activity name is an activity name of an activity performed last in the target pattern. The feature amount acquisition unit 12 acquires the activity name of the last row of the row group constituting the target pattern in the PAL as the end activity name.

(3) Number of Self-Loop Occurrences

The number of self-loop occurrences refers to the number of self-loops generated in the target pattern. The self-loop means that the same activity is continuously performed two or more times. For example, in a case where "A" is the activity name, when the activities are performed in the order of "AAAA", the number of self-loop occurrences is 3. Since the self-loop is intended for continuation of one activity, for example, "ABAB" and "ABCABC" do not correspond to the self-loop. The feature amount acquisition unit 12 detects a loop in which two or more rows including the same activity name are consecutive in the row group constituting the target pattern in the PAL, and acquires "the number of consecutive rows−1" as the number of self-loops.

(4) Number of Rework Occurrences

The number of rework occurrences refers to the number of rework occurrences in the target pattern. The rework means that the same activity is re-performed a plurality of times without being continuous in the target pattern. For example, in a case where the activity is performed in the order of "ABCACB", since one rework has occurred in each of A, B, and C, the number of rework occurrences of the target pattern is 3. The feature amount acquisition unit 12 sequentially scans the row group constituting the target pattern in the PAL, and counts the number of rows including the same activity name as the already appeared activity name, thereby acquiring the number of rework occurrences.

(5) Path Length

A path length refers to a length of the target pattern. The length of the target pattern refers to the number of executions of the activity in the target pattern. The feature amount acquisition unit 12 acquires the path length by counting the number of rows of the row group constituting the target pattern in the PAL.

(6) Number of Associated Organizations

The number of associated organizations refers to the total number (number of differences) of organizations to which workers who have performed activities generated in the target pattern belong. For each row constituting the target pattern in the PAL, the feature amount acquisition unit 12 specifies the organization name corresponding to the activity name included in the row with reference to the AUM, and acquires the number of different AUMs specified as the number of associated organizations.

(7) In-Degree

An in-degree refers to the number of sides (sides ending at each vertex) joined so as to enter each vertex in a directed graph (hereinafter, referred to as a "directed graph G") in which each activity in the target pattern is set as a vertex and the execution order includes a side from the vertex of each activity to the vertex of the next activity. Therefore, the in-degree is obtained for each vertex (for each activity). The same activity in the target pattern is mapped to the same vertex. The feature amount acquisition unit 12 acquires, for each of one or more rows including the same activity name of the row group constituting the target pattern in the PAL, the number of types (number of differences) of activity names one row before the row as the in-degree corresponding to the activity name.

(8) Out-Degree

An out-degree refers to the number of sides (sides starting from each vertex) joined so as to come out from each vertex in the directed graph G. Therefore, the out-degree is obtained for each vertex (for each activity). The feature amount acquisition unit 12 acquires, for each of one or more rows including the same activity name of the row group constituting the target pattern in the PAL, the number of types (number of differences) of activity names after one row of the row as the out-degree corresponding to the activity name.

(9) Number of Ego Network Branches

A number of ego network branches refers to the number of sides in an ego network. The ego network refers to a network in which, for each vertex in the directed graph G, a vertex adjacent to the vertex is extracted with the vertex as the center. Therefore, the number of ego network branches is obtained for each vertex (that is, for each activity of the target pattern) of the directed graph G. The feature amount acquisition unit 12 extracts, for each of one or more rows including the same activity name of the row group constituting the target pattern in the PAL, a combination of activity names of rows one row before or one row after the row. Therefore, such a combination is extracted for each activity name included in the target pattern. The feature amount acquisition unit 12 counts the number of types (number of differences) of the combination for each activity name included in the target pattern, thereby acquiring the number of ego network branches.

(10) Number of Ego Network Connection Branches (Inflow)

The number of ego network connection branches (inflow) refers to the number of sides (sides with the vertex as an end point) joined to come into any vertex of the ego network among the sides that do not constitute the ego network in the directed graph G for each ego-network. The feature amount acquisition unit 12 counts, for each ego network, the number of rows that do not correspond to any vertex of the ego network among the rows one row before the row corresponding to each vertex of the ego network in the PAL, thereby acquiring the number of ego network connection branches (inflow).

(11) Number of Ego Network Connection Branches (Outflow)

The number of ego network connection branches (outflow) refers to the number of sides (sides with the vertex as a start point) joined to come out of any vertex of the ego network among the sides that do not constitute the ego network in the directed graph G for each ego-network. The feature amount acquisition unit 12 counts, for each ego network, the number of rows that do not correspond to any vertex of the ego network among the rows one row after the row corresponding to each vertex of the ego network in the PAL, thereby acquiring the number of ego network connection branches (outflow).

The feature amounts of (1) to (11) are defined as information indicating a feature related to a structure related to an execution order of activities in a business process (target pattern).

The feature amounts of (7), (8), (9), (10), and (11) can be acquired for each activity in the target pattern. Therefore, for the feature amounts of (7), (8), (9), (10), and (11), the feature amount acquisition unit 12 calculates the average value, the median value, and the standard deviation of the values acquired for each activity for the target pattern, and sets the calculation result as the value of the feature amount in the target pattern.

(7) For the use of the feature amounts of (8), (9), (10), and (11) and the clustering based on these feature amounts, NetSimile, which is a network graph analysis technology, was referred to (Reference Literature 2 "Michele Berlingerio, Danai Koutra, Tina Eliassi-Rad, Christos Falousos, "NetSimile: A Scalable Approach to Size-Independent Network Similarity", arXiv: 1209.2684v1 [cs.SI] 12 Sep. 2012").

In addition, (7), (8), (10), and (11) are feature amounts set to distinguish whether a side is a side to be joined so as to come into or a side to be joined so as to come out of a vertex or a network from the point that the graph to be classified is a directed graph.

In the feature amount defined in Reference Literature 2, the degree and the number of egonet connection branches are set without distinguishing between input and output. However, since the business process generated by the process mining is recognized as a different pattern when there is a difference in the execution order of the activities between the business processes, in the present embodiment, the input and the output are distinguished in order to acquire the difference in the execution order of the activities as the feature amount, and are defined as the in-degree, the out-degree, the number of ego network connection branches (inflow), and the number of ego network connection branches (outflow).

As described above, in the present embodiment, the difference in the execution order of the activities is reflected in the feature amount. Therefore, the difference in the execution order of the activities in the business process can be used at the time of clustering as the difference in the pattern of the business process.

FIG. 10 is a diagram illustrating an example of a feature amount acquisition result. FIG. 10 illustrates feature amounts of pattern Nos. 1 and 2 based on the event log (FIG. 7) and the affiliation organization information (FIG. 6). On the left side of FIG. 10, the directed graphs G of the patterns Nos. 1 and 2 are illustrated.

Following step S104, the clustering execution unit 13 performs classification (clustering) of patterns (business processes) on the basis of the feature amounts input from the feature amount acquisition unit 12 and the initial number of clusters (S105). The clustering of the patterns is performed using a general non-hierarchical clustering technology. In the present embodiment, an example in which an x-means method (Reference Literature 3"] Dan Pelleg, Andrew Moore, "X-means: Extending k-means with efficient estimation of the number of clusters.", School of Computer Science, Carnegie Mellon University, Pittsburgh, PA 15213 USA, 2000") is used as a non-hierarchical clustering technology will be described. In x-means, data can be classified after setting the optimum number of clusters for data for which the number of clusters is unknown.

Subsequently, the output unit 14 outputs a classification result (result of clustering) (S106). The classification result is, for example, information indicating a pattern included in each cluster.

Figure 11:
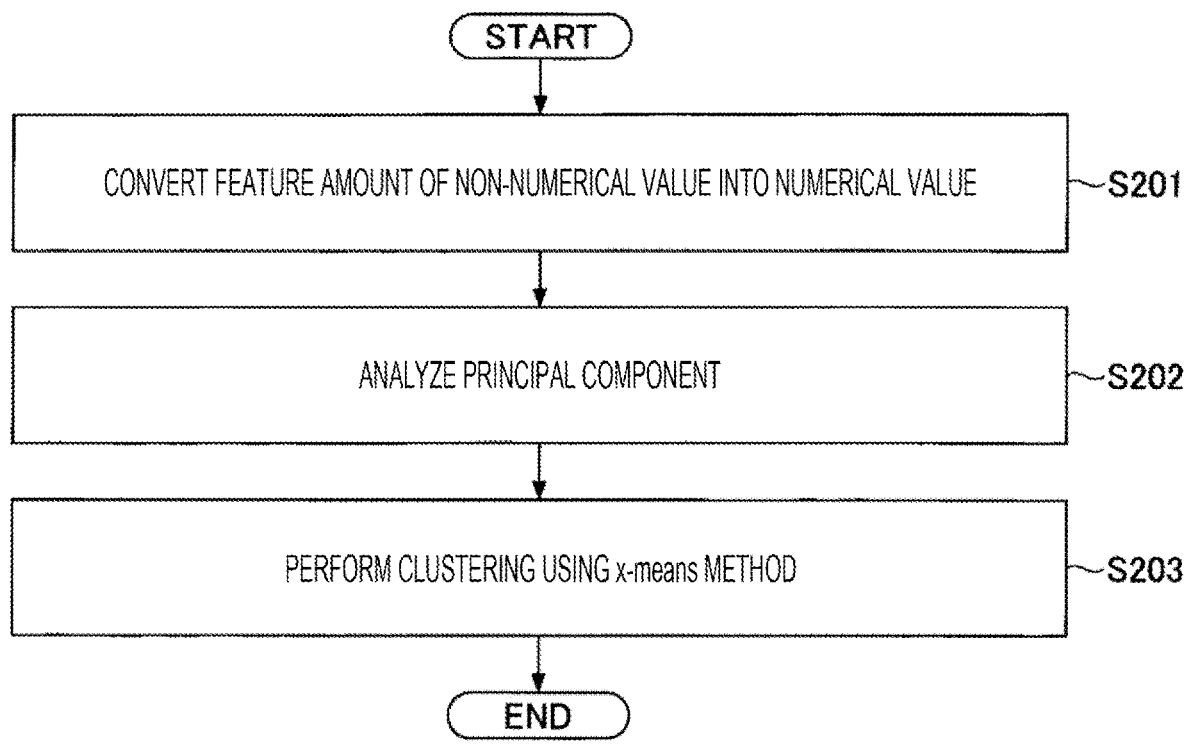
FIG. 11 is a flowchart for illustrating an example of a processing procedure of pattern classification processing.

Next, details of step S105 will be described. FIG. 11 is a flowchart for illustrating an example of a processing procedure of pattern classification processing.

In step S201, the clustering execution unit 13 converts a feature amount that is not a numerical value into a numerical value. In the present embodiment, since it is assumed that the start activity name and the end activity name are acquired as character string data, the clustering execution unit 13 converts these feature amounts into numerical values using a technology such as One-Hot-encoding.

Subsequently, the clustering execution unit 13 converts the 11 feature amounts (that is, a vector having 11 feature amounts as elements) into two-dimensional vectors by dimension reduction using principal component analysis (S202). This is to solve a problem that correct clustering cannot be performed because the number of dimensions of the input vector is too large.

Subsequently, the clustering execution unit 13 clusters the pattern groups using the x-means method based on the result of dimensionally reducing the 11 feature amounts into two dimensions (S203). At this time, the clustering execution unit 13 sets the initial number of clusters as an initial value of the number of clusters. As a result, the patterns can be necessarily classified into clusters of the initial number of clusters or more.

The processing procedure of FIG. 11 is intended for clustering using the feature amount, and One-Hot-encoding, principal component analysis, x-means method, and the like may be substituted by other technologies capable of performing the respective roles.

As described above, according to the present embodiment, the business process pattern group is classified on the basis of the feature amount related to the structure of the pattern of the business process. As a result, it is possible to support the narrowing down of the business process group to be analyzed with a smaller amount of calculation than before. That is, it is possible to support improvement in efficiency of analysis of a business process. In addition, it is possible to narrow down the business processes even if the analyst does not have knowledge about the business, and it is also possible to contribute to reduction of the operation for checking the business processes by the analyst.

For example, the analyst can narrow down each pattern belonging to a cluster to which the pattern belongs as an analysis target by picking up and checking some patterns of business processes from each cluster and then finding a pattern in which a rule violation or an unexpected procedure is performed. That is, the analyst can check the features of the patterns more evenly by checking the patterns of the classified clusters little by little, as compared with the case of randomly extracting and checking the patterns from the generated patterns. This can prevent omission of important information.

In addition, in a case where there is a difference such as a cluster to which a large number of patterns belong or a cluster to which a small number of patterns belong in the result of clustering, a cluster to which a relatively large number of patterns belong can be assumed as a standard implementation procedure (a pattern implemented by a large number of workers), or a cluster to which a relatively small number of patterns belong can be assumed as deviating from patterns belonging to other clusters. Therefore, the analyst can distinguish between a pattern that greatly deviates from other patterns and a standard pattern performed by many workers, and can narrow the analysis target to any desired pattern.

An object of Non Patent Literature 1 is to investigate a difference (presence or absence of variation) in the execution order of the activities among the actors of the performed business process.

On the other hand, as described above, an object of the present embodiment is to help an analyst to understand a business process by extracting a feature amount from each business process and classifying the feature amount into several clusters, and it is assumed that the purpose is to investigate a standard implementation procedure of a cluster in which a cluster to which many business processes belong can be estimated to be implemented by many workers by finding a cluster greatly different from other business processes or a cluster implemented by many workers using the feature amount. Therefore, since the present embodiment and the technology of Non Patent Literature 1 are essentially different in application, it can be said that it is necessary to use them properly according to the purpose of analysis.

Although the embodiment of the present invention has been described in detail above, the present invention is not limited to such a specific embodiment, and various modifications and changes can be made within the scope of the gist of the present invention described in the claims.

REFERENCE SIGNS LIST

10 Business process classification device
11 Input unit
12 Feature amount acquisition unit
13 Clustering execution unit
14 Output unit
100 Drive device
101 Recording medium
102 Auxiliary storage device
103 Memory device
104 CPU
105 Interface device
B Bus

The invention claimed is:

1. A business process classification device comprising:
a hardware processor configured to
acquire a plurality of feature amounts from each of a plurality of types of business processes, the plurality of feature amounts being related to a structure of said each of the plurality of types of business processes;
perform dimensionality reduction on the plurality of feature amounts to obtain two-dimensional feature vectors;
perform clustering on the two-dimensional feature vectors using an x-means clustering algorithm, wherein the number of clusters is automatically determined by the x-means clustering algorithm from a given initial number of clusters;
classify the plurality of types of business processes into a number of clusters determined by the x-means clustering algorithm,
wherein the hardware processor is further configured to:
identify, based on the classification result, whether each cluster represents a standard implementation or a deviation from standard implementation; and
output information indicative of the identified classification in a format usable by an external system for process management or improvement.

2. The business process classification device according to claim 1,
wherein the plurality of feature amounts include any one of a start activity name, an end activity name, the number of self-loop occurrences, the number of rework occurrences, a path length, the number of associated organizations, an in-degree, an out-degree, the number of ego network branches, the number of ego network connection branches (inflow), and the number of ego network connection branches (outflow).

3. The business process classification device according to claim 1,
wherein the hardware processor is configured to perform non-hierarchical clustering.

4. The business process classification device according to claim 3,
wherein the hardware processor is configured to perform clustering based on a result of dimensionally reducing the plurality of feature amounts.

5. The business process classification device according to claim 1,
wherein the plurality of feature amounts include any one of the number of self-loop occurrences, the number of rework occurrences, an in-degree, an out-degree, the number of ego network branches, the number of ego network connection branches (inflow), and the number of ego network connection branches (outflow).

6. A business process classification method performed by a computer including a memory and a processor, the method comprising:
acquiring, by the computer, a plurality of feature amounts from each of a plurality of types of business processes, the plurality of feature amounts being related to a structure of said each of the plurality of types of business processes;
performing, by the computer, dimensionality reduction on the plurality of feature amounts to obtain two-dimensional feature vectors;
performing, by the computer, clustering on the two-dimensional feature vectors using an x-means clustering algorithm, wherein the number of clusters is automatically determined by the x-means clustering algorithm from a given initial number of clusters; and classifying, by the computer, the plurality of types of business processes into a number of clusters determined by the x-means clustering algorithm, wherein the method further comprises:

identifying, by the computer, based on the classification result, whether each cluster represents a standard implementation or a deviation from standard implementation; and outputting, by the computer, information indicative of the identified classification in a format usable by an external system for process management or improvement.

7. A non-transitory computer-readable recording medium storing a program for causing a computer to execute a process, the process comprising:

acquiring a plurality of feature amount from each of a plurality of types of business processes, the plurality of feature amounts being related to a structure of said each of the plurality of types of business processes;

performing dimensionality reduction on the plurality of feature amounts to obtain two-dimensional feature vectors;

performing clustering on the two-dimensional feature vectors using an x-means clustering algorithm, wherein the number of clusters is automatically determined by the x-means clustering algorithm from a given initial number of clusters; and classifying the plurality of types of business processes into a number of clusters determined by the x-means clustering algorithm, wherein the process further comprises:

identifying, based on the classification result, whether each cluster represents a standard implementation or a deviation from standard implementation; and outputting information indicative of the identified classification in a format usable by an external system for process management or improvement.

\* \* \* \* \*